United States Patent
Anta Martinez et al.

(10) Patent No.: US 11,635,062 B2
(45) Date of Patent: Apr. 25, 2023

(54) WIND TURBINE AND METHOD TO DETERMINE MODAL CHARACTERISTICS OF THE WIND TURBINE IN A CONTINUOUS MANNER

(71) Applicant: General Electric Company, Schenectady, NY (US)

(72) Inventors: Adolfo Anta Martinez, Vienna (AT); Conner Brooks Shane, Glenville, NY (US); Sebastia Roca Ferrer, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 16/182,996

(22) Filed: Nov. 7, 2018

(65) Prior Publication Data
US 2020/0141391 A1 May 7, 2020

(51) Int. Cl.
*F03D 17/00* (2016.01)
*F03D 7/04* (2006.01)
(Continued)

(52) U.S. Cl.
CPC ............. *F03D 17/00* (2016.05); *F03D 7/042* (2013.01); *F03D 13/25* (2016.05); *G05B 19/05* (2013.01);
(Continued)

(58) Field of Classification Search
CPC ................................ F03D 17/00; F03D 13/25
See application file for complete search history.

(56) References Cited

U.S. PATENT DOCUMENTS 4,420,692 A 12/1983 Kos et al.
6,213,721 B1 4/2001 Watkinson
(Continued)

FOREIGN PATENT DOCUMENTS

| CN | 103605912 | 6/2016 |
|---|---|---|
| CN | 107192446 | 9/2017 |
| JP | 2017106401 | 6/2017 |

OTHER PUBLICATIONS

P.A. Fleming, A.D. Wright, and L.J. Fingersh, J.W. van Wingerden, Jan. 2011, Resonant Vibrations Resulting from the Re-Engineering of a Constant-Speed 2-Bladed Turbine to a Variable-Speed, National Renewable Energy Laboratory (Year: 2011) pp. 1-17, https://www.nrel.gov/docs/fy11osti/50009.pdf.*
(Continued)

*Primary Examiner* — Kenneth M Lo
*Assistant Examiner* — Tameem D Siddiquee
(74) *Attorney, Agent, or Firm* — Dority & Manning, P.A.

(57) ABSTRACT

An automated method to determine modal characteristics of a wind turbine tower at an offshore location in a continuous manner includes reading one or more sensor data signals, prefiltering the one or more sensor data signals to divide the signals into a plurality of time segments, obtaining a frequency domain representation of each of the plurality of time segments by computing a Power Spectral Density (PSD) of each of the time segments to identify one or more frequency peaks in each of the time segments, assigning a probability to each of the frequency peaks in the PSD of each of the time segments, combining all assigned probabilities and determining the likelihood of the one or more frequency peaks. Also disclosed is an offshore wind turbine tower having a turbine control system utilizing the automated method to determine modal characteristics of the wind turbine.

19 Claims, 5 Drawing Sheets

(51) Int. Cl.
*F03D 13/25* (2016.01)
*G05B 19/05* (2006.01)

(52) U.S. Cl.
CPC .............. *F05B 2260/80* (2013.01); *G05B 2219/15048* (2013.01); *G05B 2219/15053* (2013.01)

(56) References Cited

U.S. PATENT DOCUMENTS

| | | | |
|---|---|---|---|
| 6,695,588 | B1 | 2/2004 | Nielsen |
| 6,891,280 | B2 | 5/2005 | Siefriedsen |
| 7,109,600 | B1 | 9/2006 | Bywaters et al. |
| 7,309,930 | B2 | 12/2007 | Suryanarayanan et al. |
| 7,423,352 | B2 | 9/2008 | Suryanarayanan et al. |
| 7,508,088 | B2 | 3/2009 | Kothnur et al. |
| 7,569,945 | B2 | 8/2009 | Pedersen |
| 7,822,560 | B2 | 10/2010 | Lemieux |
| 7,902,686 | B2 | 3/2011 | Andersen et al. |
| 7,922,448 | B2 | 4/2011 | Garrido et al. |
| 7,931,438 | B2 | 4/2011 | Schellings |
| 7,952,215 | B2 | 5/2011 | Hayashi et al. |
| 8,026,623 | B2 | 9/2011 | Wakasa et al. |
| 8,044,670 | B2 | 10/2011 | Bjerge et al. |
| 8,167,556 | B2 | 5/2012 | Bjerge et al. |
| 8,174,137 | B2 | 5/2012 | Skaare |
| 8,186,949 | B2 | 5/2012 | Nielsen et al. |
| 8,226,347 | B2 | 7/2012 | Bywaters |
| 8,360,723 | B2 | 1/2013 | Veldkamp et al. |
| 8,388,315 | B2 | 3/2013 | Haans et al. |
| 8,487,464 | B2 | 7/2013 | Skaare et al. |
| 8,880,357 | B2 | 11/2014 | Nielsen |
| 8,977,401 | B2 | 3/2015 | Poulsen et al. |
| 8,979,492 | B2 | 3/2015 | Esbensen et al. |
| 9,217,415 | B2 | 12/2015 | Bowyer et al. |
| 9,273,671 | B2 | 3/2016 | Hernandez Mascarell et al. |
| 9,347,431 | B2 | 5/2016 | Esbensen et al. |
| 9,347,432 | B2 | 5/2016 | Herrig et al. |
| 9,587,629 | B2 | 3/2017 | Deshpande et al. |
| 9,644,606 | B2 | 5/2017 | Agarwal et al. |
| 9,644,609 | B2 | 5/2017 | Turner et al. |
| 9,657,717 | B2 | 5/2017 | Ollgaard et al. |
| 2007/0114799 | A1 | 5/2007 | Riesberg et al. |
| 2008/0067815 | A1 | 3/2008 | Suryanarayanan et al. |
| 2008/0145222 | A1 | 6/2008 | Schellings |
| 2008/0260514 | A1 | 10/2008 | Nielsen et al. |
| 2009/0110540 | A1* | 4/2009 | Bywaters ............... F03D 7/0296 415/47 |
| 2010/0045038 | A1 | 2/2010 | Skaare |
| 2010/0066087 | A1 | 3/2010 | Hayashi et al. |
| 2010/0111693 | A1 | 5/2010 | Wilson |
| 2010/0126115 | A1 | 5/2010 | Lim et al. |
| 2011/0254282 | A1 | 10/2011 | Lim et al. |
| 2011/0316277 | A1 | 12/2011 | Skaare et al. |
| 2012/0114482 | A1 | 5/2012 | Haans et al. |
| 2012/0133134 | A1 | 5/2012 | Scholte-Wassnik et al. |
| 2012/0133135 | A1 | 5/2012 | Su et al. |
| 2012/0143537 | A1 | 6/2012 | Nielsen |
| 2012/0204646 | A1* | 8/2012 | Lee ..................... G01M 5/0066 73/594 |
| 2012/0323543 | A1* | 12/2012 | Frederiksen ....... G05B 23/0254 703/7 |
| 2013/0001945 | A1 | 1/2013 | Hernandez Mascarell et al. |
| 2013/0094960 | A1 | 4/2013 | Bowyer et al. |
| 2013/0187383 | A1 | 7/2013 | Esbensen et al. |
| 2013/0195653 | A1 | 8/2013 | Hayashi et al. |
| 2014/0012516 | A1* | 1/2014 | Nielsen ................... F03D 13/20 702/33 |
| 2014/0312620 | A1 | 10/2014 | Korber et al. |
| 2015/0003984 | A1 | 1/2015 | Pineda Amo |
| 2015/0145253 | A1 | 5/2015 | Bayon et al. |
| 2015/0377213 | A1 | 12/2015 | Deshpande et al. |
| 2016/0123303 | A1 | 5/2016 | Ollgaard et al. |
| 2016/0215754 | A1 | 7/2016 | Seidel |
| 2016/0305403 | A1 | 10/2016 | Zheng et al. |
| 2016/0341598 | A1* | 11/2016 | Van Baren ............ G01M 7/025 |
| 2016/0377058 | A1 | 12/2016 | Caponetti et al. |
| 2017/0051725 | A1 | 2/2017 | Wang et al. |
| 2017/0175714 | A1* | 6/2017 | Asheim ................... F03D 17/00 |
| 2017/0363504 | A1* | 12/2017 | Winant ............... G01M 5/0008 |
| 2019/0145382 | A1* | 5/2019 | Kreutzfeldt ............ F03D 17/00 |
| 2019/0218738 | A1* | 7/2019 | Chang .................... E02D 27/16 |

OTHER PUBLICATIONS

E. El Ahmar, Vincent Choqueuse, Mohamed Benbouzid, Yassine Amirat, Joseph El Assad, Advanced Signal Processing Techniques for Fault Detection and Diagnosis in a Wind Turbine Induction Generator Drive Train: A Comparative Study, Sep. 2010, IEEE, pp. 1-7 (3576-3581), hal.archives-ouvertes.fr/hal-00532625/document.*

Devriendt et al., "Monitoring Resonant Frequencies and Damping Values of an Offshore Wind Turbine in Parked Conditions", IET Renewable Power Generation, vol. 8, Issue: 4, May 2014, pp. 433-441.

Chen et al., "Modal Analysis of Wind Turbine Tower", 2010 World Non-Grid-Connected Wind Power and Energy Conference, Conference Location:Nanjing, China, Nov. 5-7, 2010, pp. 1-3.

Dong et al., "Structural Vibration Monitoring and Operational Modal Analysis of Offshore Wind Turbine Structure", Ocean Engineering, vol. 150, Feb. 15, 2018, pp. 280-297.

Devriendt, C., et al., "Continuous dynamic monitoring of an offshore wind turbine on a monopile foundation", Proceedings of ISMA 2012-USD 2012, Jan. 1, 2012, pp. 4303-4318.

Gustavo, Oliveira, et al., "Development and implementation of a continuous dynamic monitoring system in a wind turbine", Journal of Civil Structural Health Monitoring, vol. 6, No. 3, Jun. 18, 2016, pp. 343-353, Springer Berlin Heidelberg, Berlin/Heidelberg.

Kraemer, Peter, et al., "Aspects of Operational Modal Analysis for Structures of Offshore Wind Energy Plants", Proceedings of the IMAC-XXVIII, Feb. 1-4, 2010, pp. 1-8, Jacksonville, Florida USA.

Di Lorenzo, Emilio, et al., "Modal Parameter Estimation for Operational W/ind Turbines", EWSHM—7th European Workshop on Structural Health Monitoring, IFFSTTAR, Inria, Universite de Nantes, Jul. 2014, pp. 764-771, Nantes, France.

Najafi, Nadia, et al., "Dynamic Behaviour Studies of a Vertical Axis Wind Turbine Blade Using Operational Modal Analysis (OMA) and Experimental Modal Analysis (EMA)", Proceedings of EWEA 2014, 2014, European wind Energy Association (EWEA), Jan. 1, 2014, pp. 1-10.

A European Search Report issued in connection with corresponding EP Application No. 19207448.2-1007 dated Apr. 2, 2020.

* cited by examiner

WIND TURBINE AND METHOD TO DETERMINE MODAL CHARACTERISTICS OF THE WIND TURBINE IN A CONTINUOUS MANNER

BACKGROUND

The present invention relates generally to wind turbines, and particularly to an automated system and method for determining modal characteristics of a wind turbine.

Wind turbines are generally regarded as an environmentally safe and a desirable source of renewable energy. In summary, a wind turbine harnesses the kinetic energy of wind and transforms this kinetic energy into electrical energy. Thus, electrical power can be generated with virtually zero emissions, unlike existing natural gas-fired or coal-fired power generation technologies. To maximize the efficacy of power generation and to simplify connection to a power grid, several wind turbines are often located in proximity to one another in what are generally referred to in the pertinent art as "wind farms." Advantageously, these wind farms are located in regions having relatively strong winds, such as, for example, at offshore locations.

At offshore locations, in order to better access the prevailing winds around the year and to limit visibility from the shore, it is desirable to install wind farms at increasing distances from the shore, and consequently deeper water depths. The typical foundation structure for an offshore wind turbine installation comprises a monopile upon which a tower is secured. A monopile is essentially a long cylindrical caisson, assembled in sections on-shore and driven to the required soil penetration depth at the offshore installation site.

In order to keep wind energy economically competitive with traditional and other renewable energy sources the cost of energy (COE) must be low. Today's offshore wind turbines rely on sophisticated load control systems to assure optimal operation and achieve low COE. Structural and fatigue loads are key factors in turbine design and the management of these loads could create a significant decrease in turbine cost by reducing required materials, lessening scheduled and unscheduled maintenance, and improving overall turbine reliability.

Load management systems of offshore wind turbines typically rely on the knowledge of the modal characteristics of the wind turbine. The modal characteristics of offshore wind turbines vary widely between design and actual values, and can even change drastically, on a daily basis, based on sea and wind conditions (e.g., sea-bed conditions, scour formation, marine growth, tidal variations, etc.). Structural parameters are needed for optimum site and turbine-specific tuning of turbine controls. For commissioning of large wind farms with several wind turbines, it is not practical to manually identify these structural parameters. In particular, turbine-specific structural parameters are needed for frequency-avoider closed loop algorithms. There is usually a deviation between the as-designed and actual values of these system parameters due to variability in site-conditions, manufacturing tolerances, etc. In addition to spatial variability, there tends to be temporal evolution of these structural parameters over time due to changes in sea-bed conditions, scour formation, marine growth, tidal variations, etc. Accordingly, it is important to identify/mitigate response to these changes in a continuous manner to ensure expected system performance and reliability.

Therefore, there is a need to design an automated procedure to identify the modal characteristics of an offshore wind turbine in a continuous manner to ensure optimum site and turbine-specific tuning of turbine controls.

BRIEF DESCRIPTION

Briefly, in accordance with one aspect of the present technique, provided is an automated method to determine modal characteristics of a wind turbine in a continuous manner. The method includes reading one or more sensor data signals, prefiltering the one or more sensor data signals to divide the one or more sensor data signals into a plurality of time segments, obtaining a frequency domain representation of each of the plurality of time segments by computing a Power Spectral Density (PSD) of each of the plurality of time segments to determine the probability that a resonant peak exists, identifying one or more resonant peaks in each of the plurality of time segments, combining all assigned probabilities and determining the likelihood of the one or more resonant peaks as an indicator of the modal characteristics of the wind turbine.

In accordance with another aspect, provided is an automated method to determine modal characteristics of a wind turbine in a continuous manner. The method includes reading one or more sensor data signals from one or more structural components of the wind turbine, prefiltering the one or more sensor data signals to divide the one or more sensor data signals into a plurality of time segments, obtaining a frequency domain representation of each of the plurality of time segments by computing a Power Spectral Density (PSD) of each of the plurality of time segments using Welch's averaged modified periodogram method of spectral estimation, assigning a probability of one or more resonant peaks using the computed PSD of each of the plurality of time segments, combining all assigned probabilities and determining the likelihood of the one or more resonant peaks as an indicator of the modal characteristics of the wind turbine.

In accordance with yet another aspect, provided is a wind turbine. The wind turbine includes a tower, a monopile upon which the tower is secured, one or more sensors arranged on at least one of the tower and the monopile for producing one or more sensor data signals and a turbine control system including a processor for processing the one or more sensor data signals to determine modal characteristics of the wind turbine in a continuous manner. The processor includes an algorithm configured to read the one or more sensor data signals from the one or more sensors, prefilter the one or more sensor data signals to divide the one or more sensor data signals into a plurality of time segments, obtain a frequency domain representation of each of the plurality of time segments by computing a Power Spectral Density (PSD) of each of the plurality of time segments, assign a probability of one or more resonant peaks using the computed PSD of each of the plurality of time segments, and combine all assigned probabilities and compute the most likely resonant peaks as an indicator of the modal characteristics of the wind turbine.

Other objects and advantages of the present disclosure will become apparent upon reading the following detailed description and the appended claims with reference to the accompanying drawings.

DRAWINGS

These and other features, aspects, and advantages of the present invention will become better understood when the following detailed description is read with reference to the accompanying drawings in which like characters represent like parts throughout the drawings, wherein.

Figure 1:
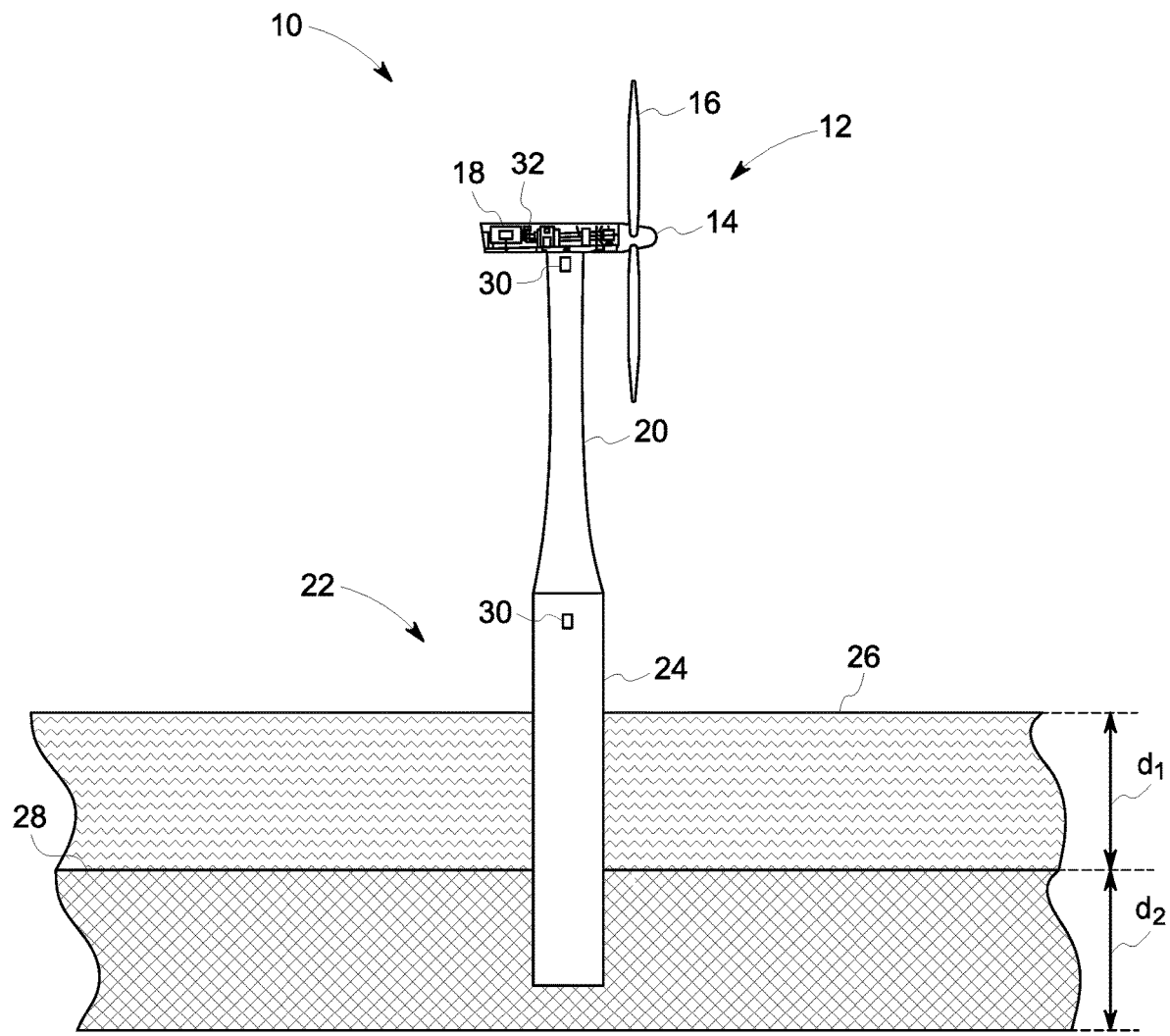
FIG. 1 is a diagrammatic illustration of an offshore wind turbine system including a system for determining modal characteristics of the wind turbine tower, in accordance with one or more embodiments shown or described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be utilized, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may be utilized, but are not limited to, an operator interface monitor.

Further, as used herein, the terms "software" and "firmware" are interchangeable and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Although exemplary embodiments of the present disclosure will be described generally in the context of an offshore wind turbine, for purposes of illustration, one of ordinary skill in the art will readily appreciate that embodiments of the present disclosure may be applied to any wind turbine structure, such as land-based wind turbines, and is not intended to be limiting to offshore structures.

Turning now to the drawings, FIG. 1 illustrates an offshore wind turbine system 10 in accordance with an exemplary embodiment of the present technique. The wind turbine system 10 includes a wind turbine generator 12 comprising a rotor 14 having multiple blades 16. Various electrical and mechanical components of the wind turbine generator 12, such as the drive train, electrical generator, etc. are housed in a nacelle 18. The rotor 14 and the nacelle 18 are mounted atop a tower 20 that exposes the blades 16 to the wind. The blades 16 transform the kinetic energy of the wind into a rotation motion of a shaft that drives a generator (not shown) to produce electrical power.

The tower 20, the nacelle 18 and the rotor 14 are mounted on a foundation structure 22. In the illustrated embodiment, the foundation structure 22 includes a monopile or central caisson 24 upon which the tower 20 is secured. The monopile 24 is a cylindrical column, extending from the tower 20 to a depth '$d_1$' below a water level 26. The monopile 24 is driven into the soil to a depth '$d_2$' below a soil surface 28, also referred to as mud line. In an embodiment, the monopile 24 may be driven, for example 20-25 meters below the mud line 28. The monopile 24 is configured to support the dead weight of the tower 20, nacelle 18 and rotor 14, axial (vertical direction) loads resulting. In an embodiment, the foundation structure 22 may include one or more mooring lines (not shown) coupling the monopile 24 to an anchor (not shown) or the like.

One or more tower acceleration sensors 30 are arranged on the tower 20, such as near the top of the tower, or at any other location on the tower. Other acceleration sensors may also be arranged at other locations on the tower 20 and/or at other locations on the wind turbine system 10 for measuring lateral and vertical vibrations. Each of the one or more acceleration sensors 30 includes a motion sensor for measuring acceleration in one or more dimensions. For example, the acceleration sensors 30 may be tri-axial or biaxial, measuring lateral and longitudinal vibrations in the time domain. As alluded to, other process variables besides vibration, such as displacement, velocity, temperature, strain and/or pressure, may also be similarly sensed at various turbine locations in a similar manner.

Vibrations in the wind turbine structural components, including the foundation structure 22, tower 20, the nacelle 18 and the rotor 14 components, may considerably reduce the life of the components and/or lead to early fatigue failures. For example, the monopile 24 should be desirably designed such that the overall natural vibration frequency of the foundation structure 22 is outside the frequency range of excitation due to the rotor operation and the hydrodynamic wave loading. Accordingly, a control system 32 is provided that may receive input from the one or more acceleration sensors 30 and includes one or more processors, such as microcontrollers, which provide signals in response to the received sensor data to control a variable pitch blade drive and/or other components of the wind turbine system 10. The acceleration sensors 30 are arranged to communicate with the control system 32 via wired and/or wireless means.

Loads management and turbine operability strategies based on frequency avoidance rely on that frequency being known to controller. In many turbine control systems for onshore wind turbines, the vibrations are typically measured with respect to a stationary reference point using accelerometers arranged at critical locations on the components of interest. These types of turbine control systems are not trying to identify modal characteristics, but to modify the behavior of the turbine without explicitly computing modal frequencies. In other instances, turbine control systems for both onshore and offshore wind turbines rely on the knowledge of modal characteristics of the design as compared to an actual value and do not consider varying operating conditions in a continuous manner. Typically, data is collected during turbine commissioning and processed by a field engineer through a Power Spectral Density-based tool. Structural modes/frequencies are identified during this process and input to a real-time turbine control system manually during commissioning and/or maintenance. As previously indicated, while for some applications this may suffice, control of offshore wind turbines requires the identification of modal characteristics in a continuous manner to ensure expected system performance and reliability in light of varying operating conditions. In many instances, the natural frequencies of the offshore wind turbine may vary widely between design and actual values, and certain modes may vary daily.

Disclosed is an exemplary method of determining modal characteristics of wind turbine system, applicable to both land-based and offshore wind turbines. The method includes the steps of: (i) reading all available signals; (ii) prefiltering the signals and dividing the signals into homogeneous segments; (iii) obtaining a frequency domain representation of each segment via a Power Spectral Density (PSD); (iv) assigning a probability to each peak in the PSD; (v) combining all probabilities from all peaks coming from all sensors; and (vi) computing the most likely peaks.

Figure 2:
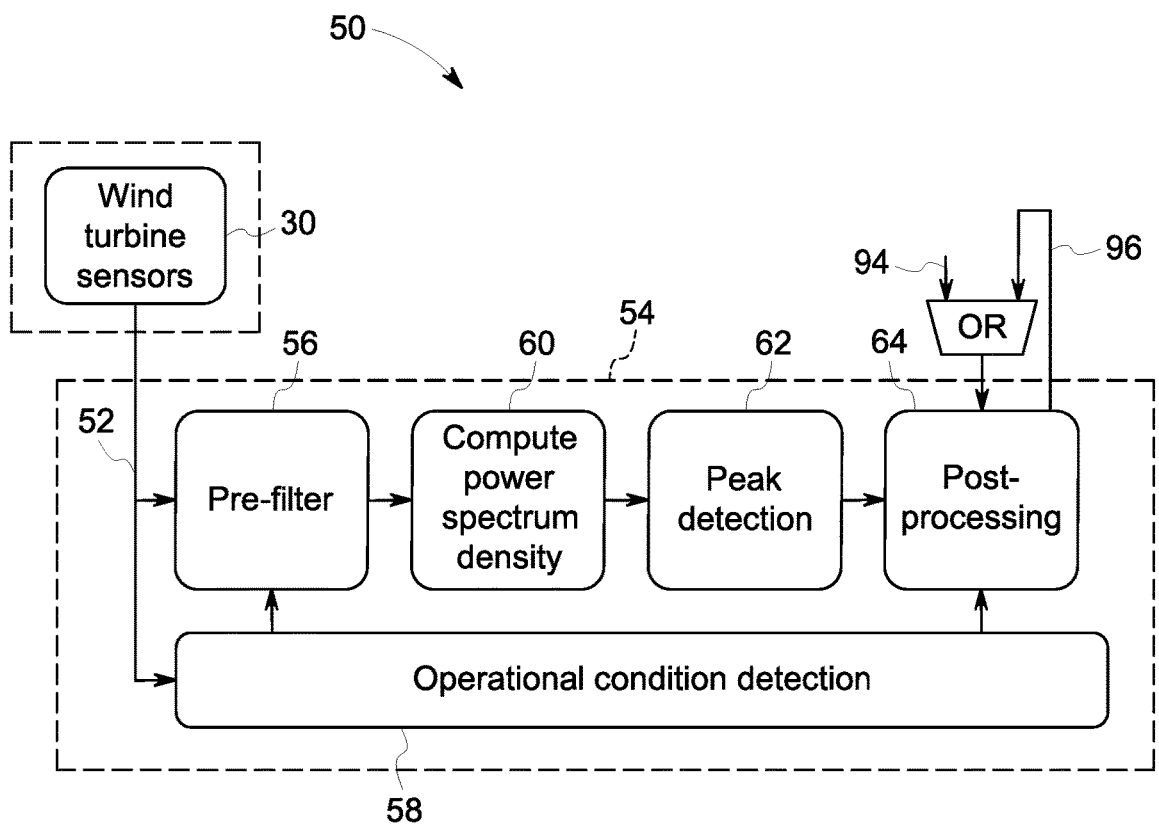
FIG. 2 is a flowchart illustrating an exemplary method of determining modal characteristics of the offshore wind turbine system of FIG. 1, in accordance with one or more embodiments shown or described herein.

Referring more specifically to FIG. 2, illustrated is a flowchart illustrating an exemplary automated method of determining modal characteristics of the wind turbine system of FIG. 1, in accordance with one or more embodiments shown or described herein. More particularly illustrated is an automated method 50 in which sensor data signals 52 from the one or more sensors 30 are input into an algorithm 54 that provides for the identification of the modal characteristics of a wind turbine in a continuous manner. The algorithm 54 may be implemented as part of the microcontroller or other processor that is arranged local to or remote from for the wind turbine system 10. As previously alluded to, the processor is inclusive of software and/or firmware stored in the processor memory and or non-transitory computer-readable media.

As an overview of the method, in an initial step of the method 50, one or more sensor data signals 52 are input for prefiltering 56 and detection of operational condition 58. During the step of prefiltering 56, the sensor data signals 52 are divided into homogeneous segments as described presently. In addition, any portion of the one or more sensor data signals 52 that is not needed can be filtered out. It is additionally anticipated by this disclosure that other types of initial signal processing, in addition to filtering, may also be used, such as amplification and/or noise reduction. In a next step 60, a frequency domain representation of each segment is computed via a Power Spectral Density (PSD). For each signal, the set of computed PSDs is used to determine the probability that a resonant peak exists versus noise in the data, in a peak detection step 62. The probabilities from all resonant peaks coming from all sensors 30 are then combined and the most likely resonant peaks are computed during a post-processing step 64. The likelihood that a particular structural mode of interest corresponds to that resonant peak can then be determined.

Figure 3:
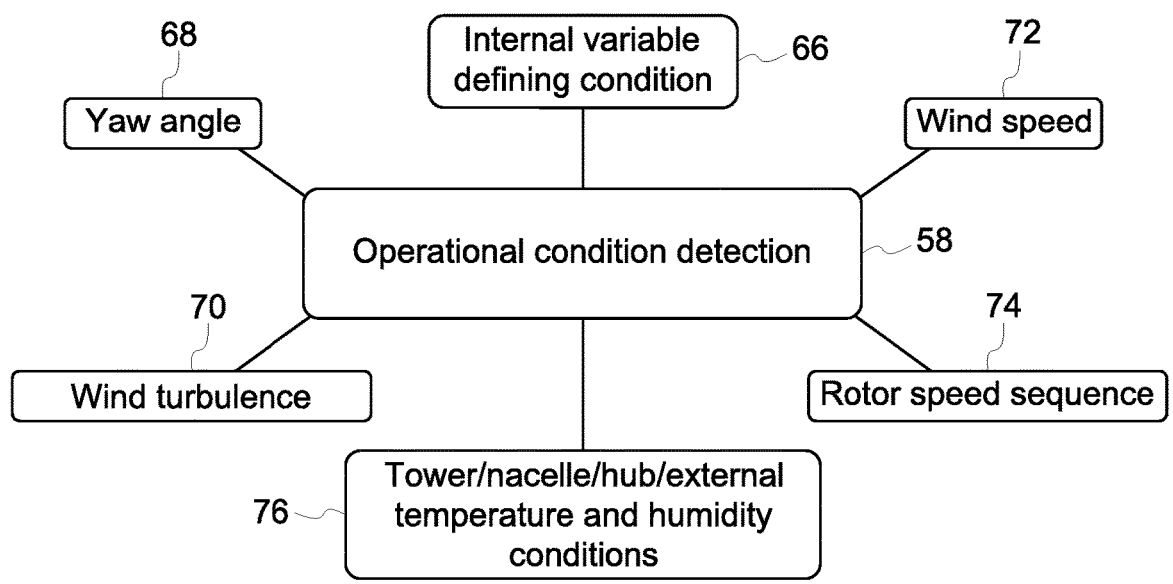
FIG. 3 is a diagrammatic illustration of the variables considered during operational condition detection of the method of FIG. 2, in accordance with one or more embodiments shown or described herein.

Referring now to FIG. 3, during the operational condition detection in step 58, multiple variables are considered to aid in segmenting the obtained sensor data signals 52. The variables may include an internal variable defining the turbine operating mode or state 66, such as standstill, startup, stop, below rated, above rated, or the like. In addition, the yaw angle 68, wind turbulence 70, wind speed 72, rotor or generator speed 74 and tower/nacelle/hub/external temperature and humidity conditions 76 may be considered.

Figure 4:
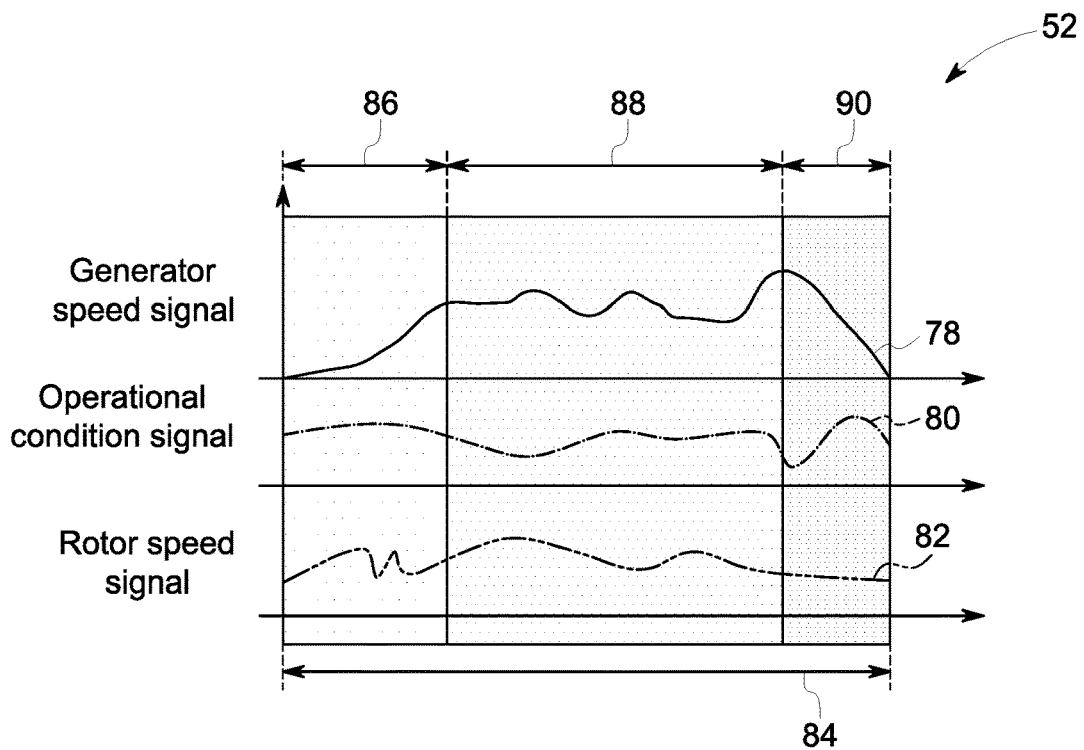
FIG. 4 is a diagrammatic chart illustrating the subdividing of signals received during operational condition detection of the method of FIG. 2, in accordance with one or more embodiments shown or described herein.
Figure 5:
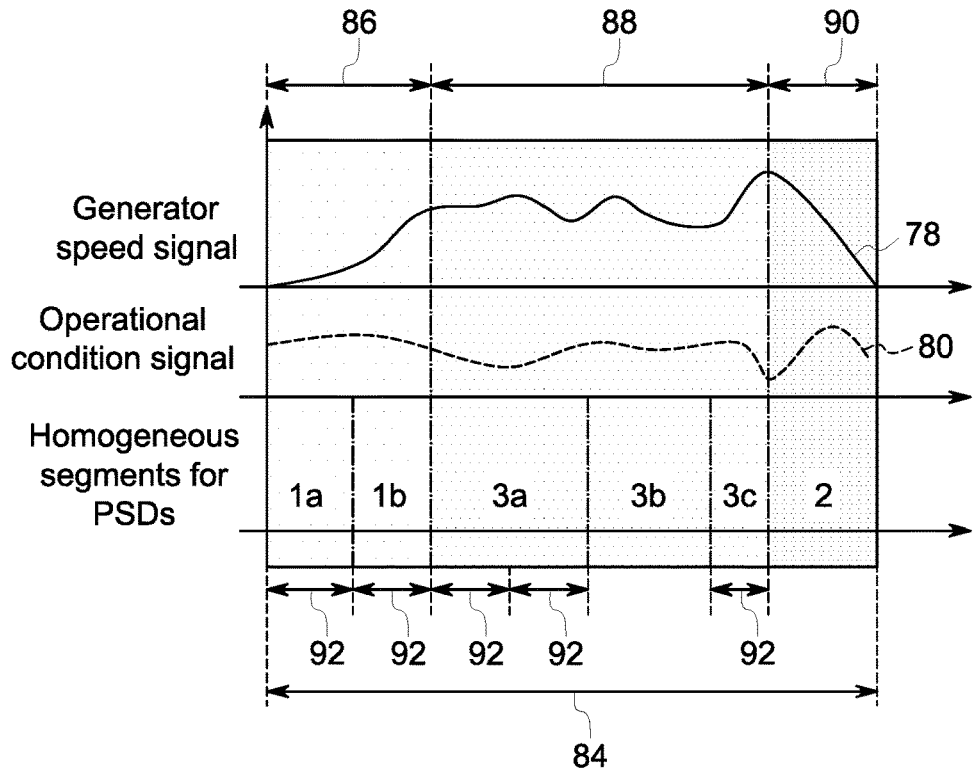
FIG. 5 is a diagrammatic chart illustrating the further subdividing of signals received during operational condition detection of the method of FIG. 2 when signals are not in a steady state regime, in accordance with one or more embodiments shown or described herein.

As previously stated, during this step, the sensor data signals 52 are divided into homogeneous segments as best illustrated in FIG. 4. More particularly, illustrated graphically, for exemplary purposes, are plotted a generator speed signal 78, an operational condition signal 80 and a rotor speed signal 82. In the exemplary illustration, each homogeneous segment 84 is subdivided into an incremental time segments 86, 88, 90. In an embodiment, incremental time segments 86, 88 and 90 may be between 5-15 minutes in length, and preferably 10-minutes in length. As further illustrated in FIG. 5, the time segments 86, 88, 90 may be further subdivided if the obtained sensor data signals 52, and more particularly, the generator speed signal 78, the operational condition signal 80 and the rotor speed signal 82, are not in a steady state regime. In the illustrated graph of FIG. 5, the time segments 86, 88, 90 are further split into segments 92, such as 1a, 1b, 3a, 3b, 3c, based on rotor speed and/or rotor speed variability. These data segments can then be collected/binned based on the operating condition, etc. described above. Subsequent to identification of the segments, an independent PSD of every segment is performed as described presently.

Figure 6:
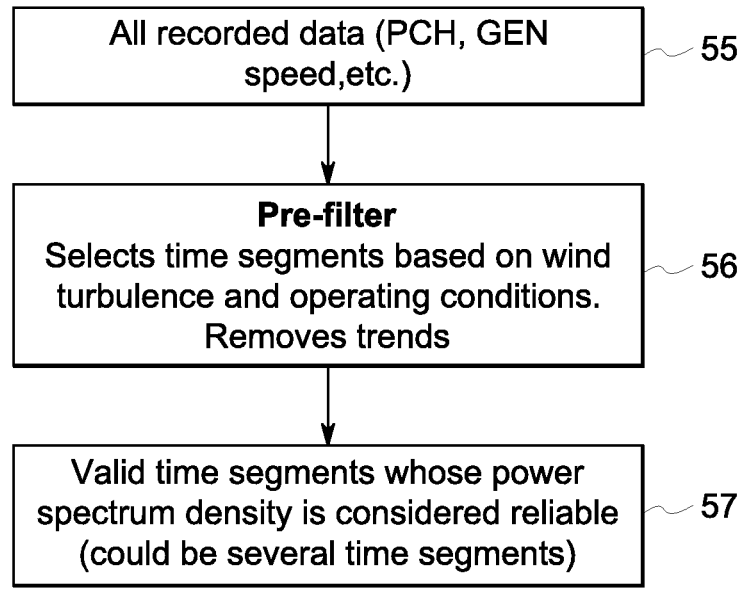
FIG. 6 is a diagrammatic illustration of the input and output criteria during the prefilter step of the method of FIG. 2, in accordance with one or more embodiments shown or described herein.

Referring now to FIG. 6, the prefiltering of the data signals 52 provides for the selection of the incremental time segments 86, 88, 90 based on wind turbulence and operating conditions and removes trends. As illustrated, during the prefiltering, all recorded data is input, in a step 55, and one or more valid incremental time segments, such as incremental time segments 86, 88, 90 are output, in a step 57, whose power spectral density (PSD) is considered reliable. During the prefiltering of the obtained data signals 52, frequencies and/or times which are not of interest may be excluded. The "filtered differential vibration signal" obtained during the step of prefiltering 56 is then sent for computing of a PSD.

Figure 7:
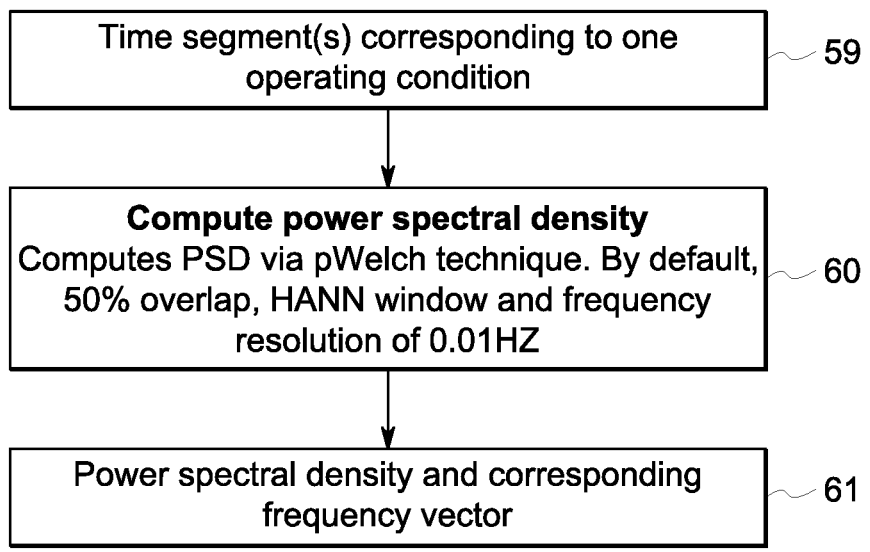
FIG. 7 is a diagrammatic illustration of the input and output criteria during the step of computing the power spectral density of the method of FIG. 2, in accordance with one or more embodiments shown or described herein.

Next, as best illustrated in FIG. 7, the incremental time segments 86, 88, 90 corresponding to an operating condition are input, in a step 59 to compute a PSD in step 60, and output the PSD and corresponding frequency vector, in a step 61. In an embodiment, the PSD is computed by using Welch's averaged modified periodogram method of spectral estimation, also noted herein as the pWelch technique. By default, there is a 50% overlap, Hann window and frequency resolution of 0.01 Hz.

Figure 8:
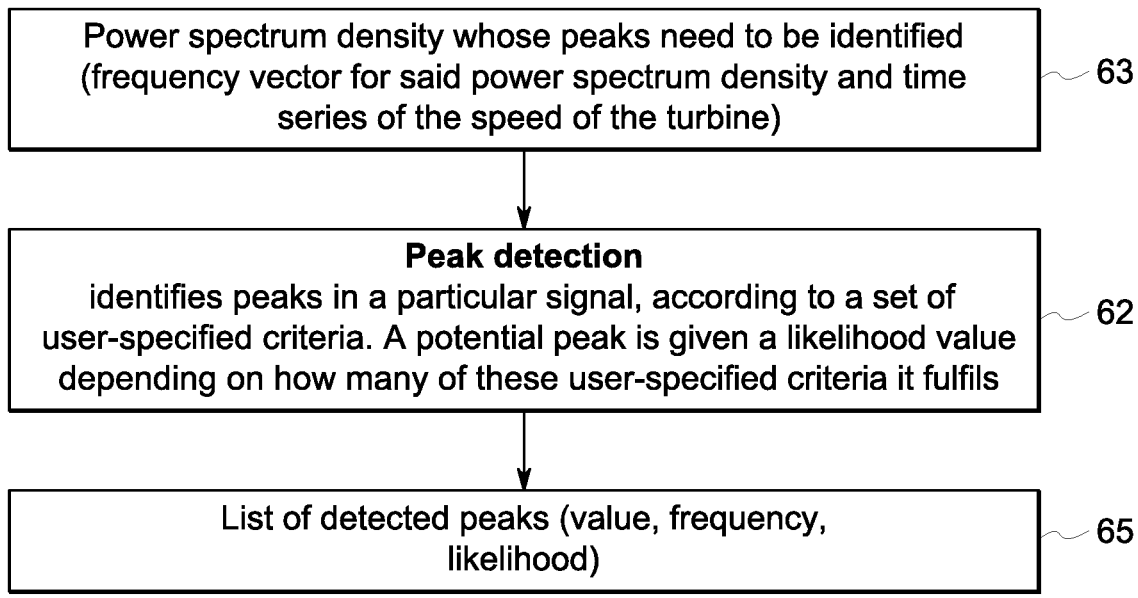
FIG. 8 is a diagrammatic illustration of the input and output criteria during peak detection of the method of FIG. 2, in accordance with one or more embodiments shown or described herein.

Referring now to FIG. 8, in the peak detection step 62, resonant peaks in a particular signal are identified, according to a set of user-specified criteria. A potential resonant peak is given a likelihood value depending on how many of these user-specified criteria it fulfils. To provide such, the power spectral density whose peaks need to be identified (frequency vector for said power spectral density and time series of the speed of the turbine) are input, in a step 63, and a list of detected resonant peaks (value, frequency and likelihood) are output, in a step 65.

Figure 9:
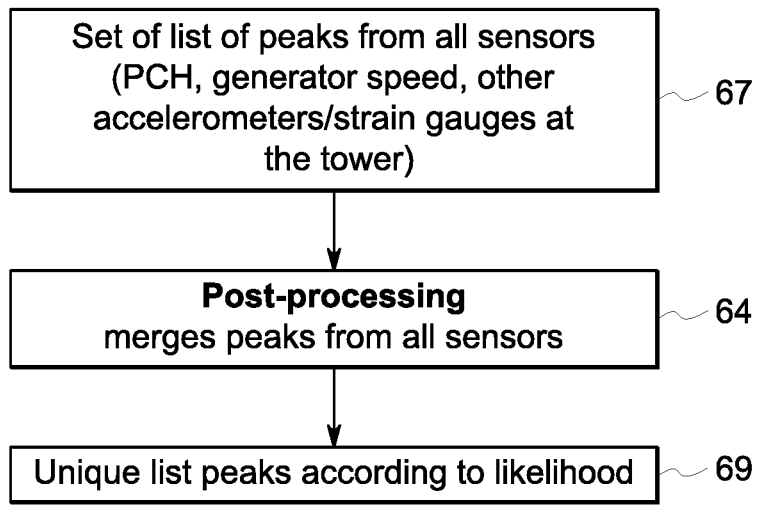
FIG. 9 is a diagrammatic illustration of the input and output during the post-processing step of the method of FIG. 2, in accordance with one or more embodiments shown or described herein.

In the post-processing step 64, as illustrated in FIG. 9, the peaks from all the sensors 30 (FIG. 2) are merged. More particularly, a list of peaks from all sensors (PCH, generator speed, other accelerometers/strain gauges at the tower, or the like) are input in a step 67, and a unique list of resonant peaks according to likelihood are output, in a step 69. With respect to the determination of the likelihood of the identified peaks, the determination may be made based on boolean (criterion is fulfiled or not) vs quantitative metrics. If boolean, an assignment of likelihood may use I/O whether a particular criterion is satisfied (min height, theoretical model, min distance between peaks, etc.). If quantitative, an assignment of likelihood may be based on the peak height, how close it is to an nP component or to a theoretical and/or operating conditions. Then, all criteria all added up and ranked accordingly. The likelihoods may be updated based on expected theoretical modes: type of sensor, operating condition and closeness to an expected mode. A determination is then made as to the likelihood that a particular structural mode of interest corresponds to the resonant peak.

As an example, during the post-processing step 64, and with reference to FIG. 2, if the process is started for a new turbine that was just installed, the process would start from the assumption the frequency of these modes (modal frequency) in a priority sense (would likely come from a design model of the wind turbine for example), as illustrated theoretical values 94. As the obtained sensor data signals 52 are processed by the algorithm 54, it may be determined that the frequencies of the modes for that particular turbine are different than what is expected and the theoretical values 94 would be replaced with the values 96 that are computed via the algorithm 54. In an embodiment, a best guess at what the modal frequencies are is stored, so that a likelihood that a modal frequency has changed or shifted can be determined. As an example, initially the theoretical values may be used, and based upon confidence that the values have changed from their theoretical values, the values provided by the post-processing step 64 are used.

The above described technique enables the automated identification of modal characteristics of a wind turbine in either an offshore location or onshore location based on measurements from different sensors and operating conditions of the turbine. The method provides for the automated identification of modal characteristics in light of deviations between the as-designed and actual values of turbine-specific structural parameters due to temporal evolution of site-conditions and manufacturing tolerances. The method further provides for the identification and mitigation of a response to the changes in modal characteristics in a continuous manner to ensure expected system performance and reliability.

Although specific features of various embodiments of the invention may be shown in some drawings and not in others, this is for convenience only. In accordance with the principles of the invention, any feature of a drawing may be referenced and/or claimed in combination with any feature of any other drawing.

While the disclosure has been described in detail in connection with only a limited number of embodiments, it should be readily understood that it is not limited to such disclosed embodiments. Rather, the embodiments can be modified to incorporate any number of variations, alterations, substitutions or equivalent arrangements not heretofore described, but which are commensurate with the spirit and scope of the disclosure. Additionally, while various embodiments have been described, it is to be understood that aspects of the invention may include only some of the described embodiments. Accordingly, the disclosure is not to be seen as limited by the foregoing description, but is only limited by the scope of the appended claims.

What is claimed is:

1. An automated method to determine modal characteristics of a wind turbine in a continuous manner, the automated method comprising:
    obtaining, via a turbine control system, one or more sensor data signals obtained from one or more tower acceleration sensors arranged on at least one of a tower of the wind turbine and a monopile upon which the tower is secured;
    prefiltering the one or more sensor data signals to divide the one or more sensor data signals into a plurality of time segments;
    further segmenting the one or more sensor data signals based on a detected operational condition, wherein detecting the operational condition includes considering at least one of an internal variable defining turbine operating mode, a yaw angle, a wind turbulence condition, a wind speed, a rotor speed variability, a generator speed, a nacelle/hub temperature condition, a humidity condition, and a pressure condition;
    computing, via Welch's averaged modified periodogram method of spectral estimation, a Power Spectral Density (PSD) of each of the plurality of time segments;
    identifying one or more resonant peaks in each of the plurality of time segments based on the computed PSD of each of the plurality of time segments;
    merging the identified one or more resonant peaks, wherein merging the identified one or more resonant peaks comprises inputting and combining the identified one or more resonant peaks into a list;
    outputting a unique list of resonant peaks according to an assignment of a likelihood of the identified one or more resonant peaks as an indicator of the modal characteristics of the wind turbine, wherein the assignment of the likelihood of the identified one or more resonant peaks as the indicator of the modal characteristics of the wind turbine is determined, via Boolean, wherein the assignment of the likelihood uses the Boolean whether a particular criterion is satisfied, wherein the particular criterion includes at least one of minimum height of the identified one or more resonant peaks, theoretical model, and minimum distance between the identified one or more resonant peaks;
    and modifying turbine-specific tuning in a continuous manner, via automated adjustments of the turbine control system, in response to the indication of changes in modal characteristics of the wind turbine.

2. The automated method as claimed in claim 1, wherein the one or more sensor data signals include vibration signals from one or more structural components of the wind turbine.

3. The automated method as claimed in claim 2, wherein the one or more structural components of the wind turbine include a foundation structure, a tower, a nacelle and a rotor component.

4. The automated method as claimed in claim 1, wherein the one or more sensor data signals include data representing one or more of vibration, displacement, velocity, temperature, strain and/or pressure.

5. The automated method as claimed in claim 1, wherein prefiltering the one or more sensor data signals includes further subdividing the plurality of time segments into a plurality of segments.

6. The automated method as claimed in claim 1, wherein computing a Power Spectral Density (PSD) of each of the plurality of time segments includes a 50% overlap.

7. The automated method as claimed in claim 1, wherein computing a Power Spectral Density (PSD) of each of the plurality of time segments includes a frequency resolution of 0.01 Hz.

8. The automated method as claimed in claim 1, wherein computing a Power Spectral Density (PSD) of each of the plurality of time segments includes using a Hann window function.

9. The automated method as claimed in claim 1, wherein the wind turbine is an offshore wind turbine.

10. An automated method to determine modal characteristics of a wind turbine in a continuous manner, the method comprising:
    obtaining, via a turbine control system, one or more sensor data signals from one or more structural components of the wind turbine, the one or more sensor data signals obtained from one or more tower acceleration sensors arranged on at least one of a tower of the wind turbine and a monopile upon which the tower is secured;
    prefiltering the one or more sensor data signals to divide the one or more sensor data signals into a plurality of time segments;
    further segmenting the one or more sensor data signals based on a detected operational condition, wherein detecting the operational condition includes considering at least one of an internal variable defining turbine operating mode, a yaw angle, a wind turbulence condition, a wind speed, a rotor speed, a generator speed, a nacelle/hub temperature condition, a humidity condition, and a pressure condition;
    obtaining a frequency domain representation of each of the plurality of time segments by computing a Power Spectral Density (PSD) of each of the plurality of time segments using Welch's averaged modified periodogram method of spectral estimation;
    assigning a probability of one or more resonant peaks using the computed PSD of each of the plurality of time segments;
    combining all assigned probabilities;
    identifying one or more resonant peaks in each of the plurality of time segments based on the computed PSD of each of the plurality of time segments;
    merging the identified one or more resonant peaks, wherein merging the identified one or more resonant peaks comprises inputting and combining the identified one or more resonant peaks into a list;
    outputting a unique list of resonant peaks according to an assignment of a likelihood of the identified one or more resonant peaks as an indicator of the modal characteristics of the wind turbine, wherein the assignment of the likelihood of the identified one or more resonant peaks as an indicator of the modal characteristics of the wind turbine is determined, via Boolean, as an indication of changes in the modal characteristics of the wind turbine, wherein the assignment of the likelihood uses the Boolean whether a particular criterion is satisfied, wherein the particular criterion includes at least one of minimum height of the identified one or more resonant peaks, theoretical model, and minimum distance between the identified one or more resonant peaks;

and modifying turbine-specific tuning in a continuous manner, via automated adjustments of the turbine control system, in response to the indication of changes in modal characteristics of the wind turbine.

11. The automated method as claimed in claim 10, wherein the one or more structural components of the wind turbine include a foundation structure, a tower, a nacelle and a rotor component.

12. The automated method as claimed in claim 10, wherein the one or more sensor data signals include data representing one or more of vibration, displacement, velocity, temperature, strain and pressure.

13. The method as claimed in claim 10, wherein prefiltering the one or more sensor data signals includes dividing the one or more sensor data signals into a plurality of incremental time segments.

14. The method as claimed in claim 13, wherein prefiltering the one or more sensor data signals includes dividing the one or more sensor data signals into a plurality of 10-minute incremental time segments.

15. The method as claimed in claim 14, wherein prefiltering the one or more sensor data signals further includes sub-dividing the plurality of incremental time segments.

16. A wind turbine, comprising:
a tower;
a monopile upon which the tower is secured;
one or more sensors arranged on at least one of the tower and the monopile for producing one or more sensor data signals; and
a turbine control system including a processor for processing the one or more sensor data signals to determine modal characteristics of the wind turbine in a continuous manner, wherein the processor comprises:
an algorithm configured to:
read the one or more sensor data signals from the one or more sensors,
prefilter the one or more sensor data signals to divide the one or more sensor data signals into a plurality of time segments,
further segment the one or more sensor data signals based on a detected operational condition,
obtain a frequency domain representation of each of the plurality of time segments by computing a Power Spectral Density (PSD) of each of the plurality of time segments,
assign a probability of one or more resonant peaks using the computed PSD of each of the plurality of time segments,
combine all assigned probabilities,
identify one or more resonant peaks in each of the plurality of time segments based on the computed PSD of each of the plurality of time segments,
merge the identified one or more resonant peaks by inputting and combining the identified one or more resonant peaks into a list,
output a unique list of resonant peaks according to an assignment of a likelihood of the identified one or more resonant peaks as an indicator of the modal characteristics of the wind turbine, wherein the assignment of the likelihood of the identified one or more resonant peaks as an indicator of the modal characteristics of the wind turbine is determined,
and wherein the assignment of the likelihood uses Boolean whether a particular criterion is satisfied,
wherein the particular criterion includes at least one of minimum height of the identified one or more resonant peaks, theoretical model, and minimum distance between the identified one or more resonant peaks;
wherein the operational condition is detected by considering at least one of an internal variable defining turbine operating mode, a yaw angle, a wind turbulence condition, a wind speed, a rotor speed a generator speed, a nacelle/hub temperature condition, a humidity condition, and a pressure condition, and
wherein the turbine control system provides turbine-specific tuning in a continuous manner, via automated adjustments of the turbine control system, in response to the indication of changes in modal characteristics of the wind turbine.

17. The wind turbine as claimed in claim 16, wherein the turbine control system provides control signals in response to the received sensor data signals to control components of the wind turbine.

18. The wind turbine as claimed in claim 17, wherein the one or more sensors are arranged to communicate with the turbine control system via at least one of a wired and wireless coupling.

19. The wind turbine as claimed in claim 17, wherein the wind turbine is an offshore wind turbine.

* * * * *